US009855800B2

(12) United States Patent
Fontaine et al.

(10) Patent No.: US 9,855,800 B2
(45) Date of Patent: Jan. 2, 2018

(54) TRIPLETUBE TIRE

(71) Applicant: The Goodyear Tire & Rubber Company, Akron, OH (US)

(72) Inventors: Sebastien Willy Fontaine, Vichten (LU); Armand René Gabriel Leconte, Bigonville (LU); Frederic Ngo, Blaschette (LU); Claude Ernest Felix Boes, Erpeldange-sur-Sûre (LU); Ralf Reinardt, Perl-Besch (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 118 days.

(21) Appl. No.: 15/049,190

(22) Filed: Feb. 22, 2016

(65) Prior Publication Data

US 2017/0239996 A1    Aug. 24, 2017

(51) Int. Cl.
*B60C 11/00*    (2006.01)
*B60C 23/00*    (2006.01)
*B60C 5/22*    (2006.01)
*B60C 29/00*    (2006.01)
*B60C 29/04*    (2006.01)
*B60C 13/00*    (2006.01)

(52) U.S. Cl.
CPC .......... *B60C 11/0083* (2013.01); *B60C 13/00* (2013.01); *B60C 23/004* (2013.01); *B60C 29/007* (2013.01); *B60C 29/04* (2013.01); *B60C 5/22* (2013.01)

(58) Field of Classification Search
CPC .. B60C 5/08; B60C 5/02; B60C 5/025; B60C 5/04; B60C 5/10; B60C 5/20; B60C 5/22; B60C 5/24; B60C 29/007; B60C 29/04; B60C 29/00; B60C 23/00; B60C 23/001; B60C 11/0083; B60C 11/01; B60C 11/02
USPC ............. 152/450, 339.1, 340.1, 341.1, 342.1
See application file for complete search history.

(56) References Cited

U.S. PATENT DOCUMENTS

| | | | | |
|---|---|---|---|---|
| 1,679,444 | A * | 8/1928 | Pagenhart | B60C 5/025 |
| | | | | 152/341.1 |
| 5,810,451 | A * | 9/1998 | O'Brien | B60B 3/02 |
| | | | | 152/210 |
| 6,470,935 | B1 * | 10/2002 | Fulsang | B60C 5/22 |
| | | | | 152/329 |
| 6,615,888 | B2 * | 9/2003 | Elkow | B60B 11/04 |
| | | | | 152/339.1 |
| 8,020,596 | B1 | 9/2011 | Morrison | |
| 2005/0092411 | A1 * | 5/2005 | O'Brien | B29D 30/66 |
| | | | | 152/209.18 |

(Continued)

FOREIGN PATENT DOCUMENTS

CN    103707719    *    4/2014    ............... B60C 5/22

OTHER PUBLICATIONS

CN 103707719, Apr. 2014, English language Abstract.*
CN 103707719, Apr. 2014, English language machine translation.*

*Primary Examiner* — Eric Hug
(74) *Attorney, Agent, or Firm* — Robert N. Lipcsik

(57) ABSTRACT

The present application relates to a tire (6) comprising: a tread portion (8) and side walls (10), said tread portion (8) and side walls (10) defining a main air chamber (12); at least two auxiliary chambers (14, 16, 18) formed in the tread portion (8); and an air transfer device (28) for transferring air between the main air chamber (12) and each of the auxiliary air chambers (14, 16, 18).

6 Claims, 4 Drawing Sheets

(56) References Cited

U.S. PATENT DOCUMENTS

| | | | |
|---|---|---|---|
| 2009/0315696 A1* | 12/2009 | Browne | B29D 30/0061 340/442 |
| 2013/0153082 A1* | 6/2013 | Lynar | B60C 23/004 141/1 |
| 2015/0027607 A1* | 1/2015 | Satpathy | B60C 19/122 152/333.1 |

* cited by examiner

TRIPLETUBE TIRE

TECHNICAL FIELD

The invention is directed to the field of tires, more particularly tires for vehicles, said vehicles including trucks and passenger cars.

BACKGROUND ART

Prior art patent document published US 2005/0092411 A1 discloses a tire with a central auxiliary chamber formed in the tread portion. This chamber can be inflated independently of the main chamber defined by the side walls and the tread portion. The central area of the outer surface of the tread portion, corresponding to the auxiliary chamber comprises studs. When the auxiliary chamber is not inflated, the central area of the outer surface of the tread portion forms a deepening so that the studs are retracted and do not contact the road or ground. When the auxiliary chamber is inflated, the central area of the outer surface is raised so that the studs extends beyond the general plane of the outer surface. The inflation and deflation of the auxiliary chamber is achieved by a unit comprising a pump and a valve, said unit being attached to the inner side of one of the sidewalls and pneumatically connected to the auxiliary chamber via a conduit extending along the inner face of the sidewall and the tread portion. This tire permits to provide increased traction in severe conditions such as on snow and ice, while permitting driving under normal conditions without damaging the road and without producing unnecessary additional noise. The scope of use of this tire is however quite limited since it is specifically intended for regions where ice or at least severe conditions prevail.

Prior art patent document published U.S. Pat. No. 8,020,596 B1 discloses an integrated wheel for electric vehicles which is intended to substantially reduce energy loss due to tire flex. The wheel comprises a tire made of a central outer ring and side walls made of several lateral rings, said central and lateral rings forming a general V-shaped cross-section. When the road conditions are good, the sidewalls do not substantially deform so that only the central outer ring contacts the road. When the road conditions become rougher, the sidewalls temporarily buckle in response to the increased road forces, simulating a low pressure conventional tire having ample space for deformation.

Although there have been significant developments in the developments of tires with regard to fuel consumption and dynamic road behavior, significant room for improvement remains.

SUMMARY OF THE INVENTION

According to a first aspect, the invention consists of a tire comprising: a tread portion and side walls, said tread portion and side walls defining a main air chamber; at least two auxiliary chambers formed in the tread portion; and an air transfer device for transferring air between the main air chamber and each of the auxiliary air chambers.

According to a preferred embodiment, the auxiliary air chambers are annular air chambers disposed parallel to each other.

According to a preferred embodiment, the auxiliary air chambers comprise a central air chamber and two side air chambers.

According to a preferred embodiment, the tread portion comprises an inner wall delimiting the main air chamber, the air transfer device being disposed on said inner wall.

According to a preferred embodiment, the air transfer device comprises air passages through the inner wall connecting each of the auxiliary air chambers with the main air chamber.

According to a preferred embodiment, the inner wall is integrally formed with the sidewalls.

According to a preferred embodiment, the air transfer device comprises at least a valve for opening and closing the air passages between the main air chamber and each of the auxiliary air chambers.

According to a preferred embodiment, the air transfer device comprises at least a pump for transferring air between the main air chamber and each of the auxiliary air chambers.

According to a preferred embodiment, the pump is a piezoelectric pump.

According to a preferred embodiment, the tread portion comprises an outer wall with a tread, said outer wall extending generally parallel to the inner wall.

According to a preferred embodiment, the tread portion comprises vertical walls extending between the inner and outer walls, said vertical walls separating the auxiliary air chambers from each other.

According to a preferred embodiment, the air transfer device is configured for operating in a first mode where the pressure in each auxiliary air chamber is substantially the same, a second mode where the pressure in one of said chambers is higher than in the other(s).

According to a preferred embodiment, the cross-section of at least one of the auxiliary air chambers comprises a transversal maximum dimension that is larger than a radial maximum dimension.

According to a second aspect, the invention consists of a tire comprising: a tread portion and side walls, said tread portion and side walls defining a main air chamber; a central auxiliary air chamber and two side auxiliary air chambers, said central and side chambers being formed in the tread portion; and a device for controlling the pressure in the auxiliary chambers, said device being configured for operating in a first mode where the pressure in each auxiliary air chamber is substantially the same, a second mode where the pressure in the central auxiliary air chamber is lower than in the side auxiliary air chambers and a third mode where the pressure in the central auxiliary air chamber is higher than in one of the side auxiliary air chambers and is lower than in the other of the side auxiliary air chambers.

According to a preferred embodiment, the tread portion comprises an outer surface, said surface being substantially flat in the first mode, said surface comprising a central annular raised area in the second mode and said surface being substantially flat and inclined in the third mode.

According to a preferred embodiment, the tread portion comprises an outer surface with a central strip corresponding to the central auxiliary air chamber, and two side strips corresponding to the side auxiliary air chambers, respectively; the outer surface comprising an annular recess between the central strip and at least one of the side strips.

According to a preferred embodiment, the device for controlling the pressure is an air transfer device for transferring air between the main air chamber and each of the auxiliary air chambers.

According to a preferred embodiment, the device for controlling the pressure comprises a transceiver for wirelessly communicating with an external device.

The features of the above preferred embodiments of both first and second aspects are disclosed in any combination provided these combinations are technically compatible.

The features relating to the second aspect are also disclosed in combination with the first aspect and vice versa.

BRIEF DESCRIPTION OF THE DRAWINGS

The novel features believed characteristic of the system of the present application are set forth in the appended claims. However, the tire itself, as well as a preferred mode of use, and further objectives and advantages thereof, will best be understood by reference to the following detailed description when read in conjunction with the accompanying drawings, wherein:

Figure 1:
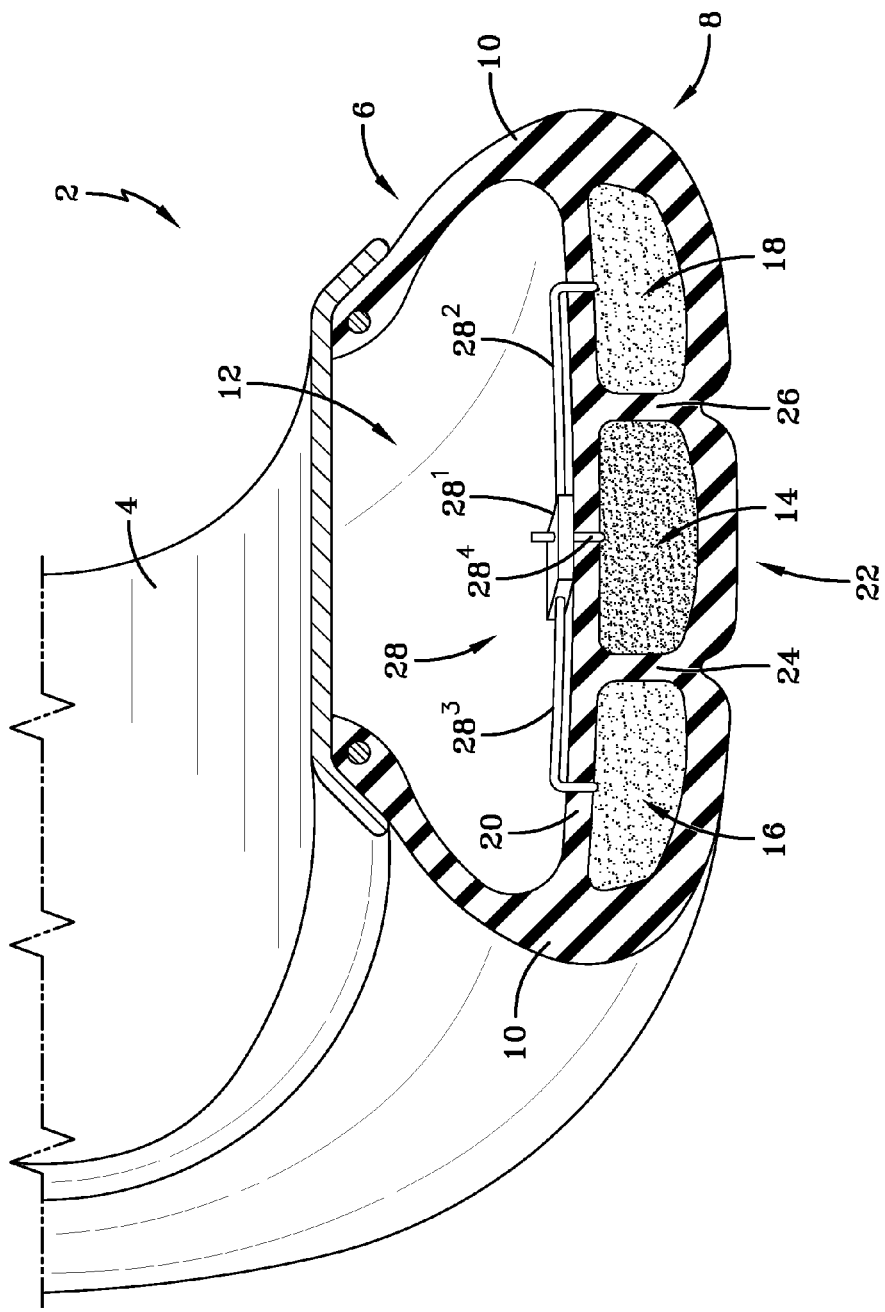
FIG. 1 is a perspective view of a tire mounted on a wheel, in accordance with an embodiment of the invention.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF A EMBODIMENTS OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a perspective view of a wheel 2 comprising a tire 6 mounted on a rim, the tire being according to an embodiment of the invention. The wheel and the tire visible in FIG. 1 are cut for showing their cross-sections. The tire 6 comprises a tread portion 8 and sidewalls 10, on each side of the tread portion 8. The sidewalls 10 and the tread portion 8 define with the rim 4 a main air chamber 12. This chamber is generally annular and is intended to be filled with air or any compatible gas, as is generally known in the field.

The tread portion 8 comprises three auxiliary air chambers 14, 16 and 18. These are preferably integrally formed in the tread portion 8, as this will be explained below. These chambers are also annular chambers, like the main one 12, and are substantially parallel to each other. The chamber 14 is a central one and the chambers 16 and 18 are side chambers arranged on each side of the central one 14, respectively.

The tread portion 8 comprises an inner wall 20 that delimits the auxiliary chambers 14, 16 and 18, and also the main chamber 12. This inner wall extends preferably substantially parallel to the outer wall 22 with the tread that contacts the road. Intermediate walls 24 and 26 delimit the auxiliary chambers 14, 16 and 18 between each other. More specifically, the intermediate wall 24 extends essentially vertically, or said differently perpendicular to the axis of rotation of the wheel and of the tire, between the outer wall 22 and the inner wall 20 of the tread portion 8, separating the side chamber 16 from the central one 14. Similarly, the intermediate wall 26 extends essentially vertically or perpendicularly to the axis of rotation of the wheel and of the tire, between the outer wall 22 and the inner wall 20 of the tread portion 8, separating the other side chamber 18 from the central one 14.

The cross-section of the auxiliary chambers can be generally circular or oval as illustrated in FIG. 1. The height of these chambers can be comprised between 10% and 30% of the total height of the tire. More preferably, the height of these chambers can be comprises between 10% and 20% of the total height of the tire. These values are to be expressed for a tire in an unloaded and uninflated state, i.e. not mounted on the rim of a wheel.

The inner wall 20 of the tread portion 8 is preferably integral with the side walls 10, i.e. manufactured when manufacturing the tire and comprising at least essentially the same material as the sidewalls, namely rubber and reinforcing plies and/or belts. The same applies to the intermediate walls 24 and 26.

The tire 6 comprises also a device 28 for transferring air from and to the auxiliary chambers 14, 16 and 18. More specifically, the device 28 permits to control the transfer of air from the main chamber 12 to each of the auxiliary chamber 14, 16 and 18, independently. To that end, the device 28 comprises a pump and valve unit $28^1$ and conduits $28^2$, $28^3$ and $28^4$ interconnecting said unit $28^1$ individually with each of the auxiliary chambers 14, 16 and 18. The unit $28^1$ is also interconnected with the main chamber 12, so that it can transfer air from the main chamber to each of the auxiliary chambers 14, 16 and 18, individually, and vice versa. The unit $28^1$ can be of the piezo electric type, as is well known as such to the skilled person.

The air transferring device 28 is preferably located on the interior side of the inner wall 20, i.e. the side that is directed towards the rim 4, so as to be in the main chamber 12.

The air transferring device 28 can comprise energy storage means and a transceiver so as to be able to wirelessly communicate with an external device (not represented).

The regular pressure in the main chamber 12 is preferably higher than the pressure in the auxiliary chambers 14, 16 and 18, for the intermediate walls 24 and 26 of a reduced height provide already an increased rigidity to the tread portion 8, compared to the main chamber 12. The pressure in the main chamber 12 can for example of about 3.5 bar and the pressure in the auxiliary chambers can range from 1.6 to 2.6 bar.

Figure 2:
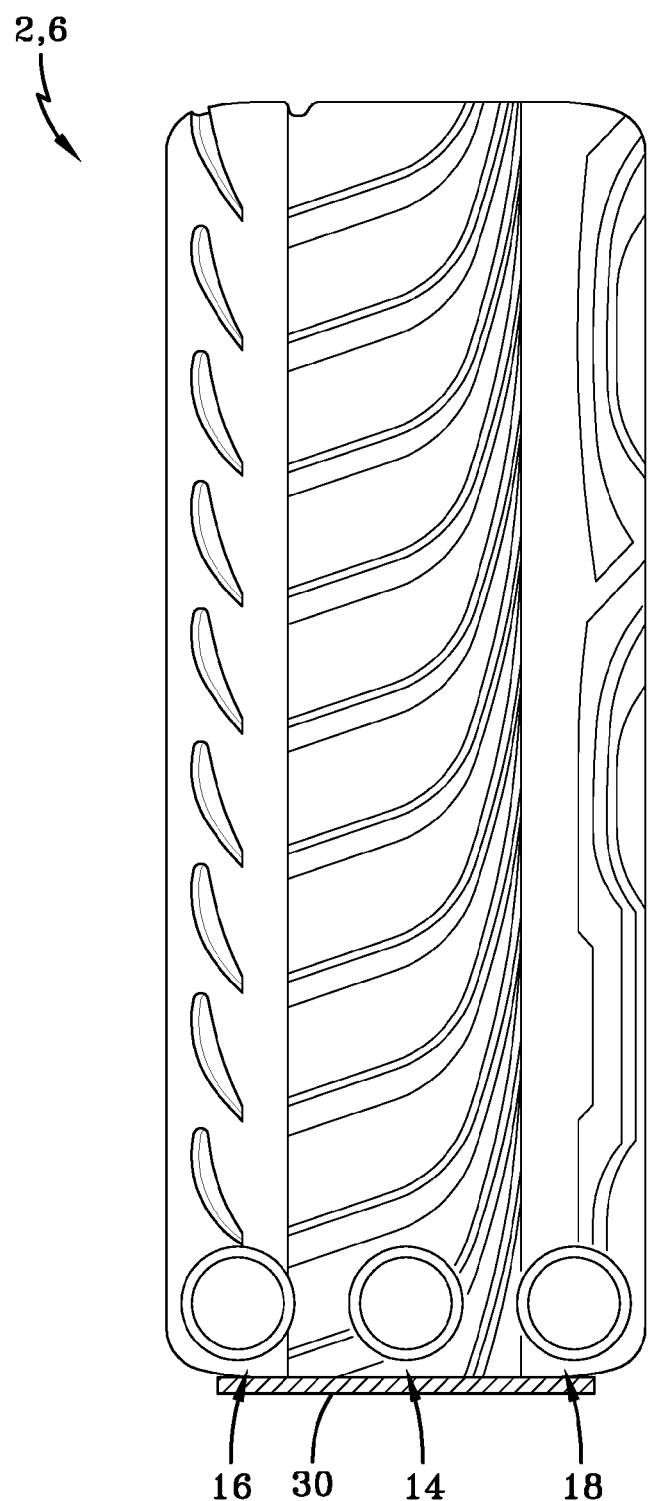
FIG. 2 is a representation of the tire of FIG. 1 in a first mode, namely where the pressure in each auxiliary chamber is substantially the same.
Figure 3:
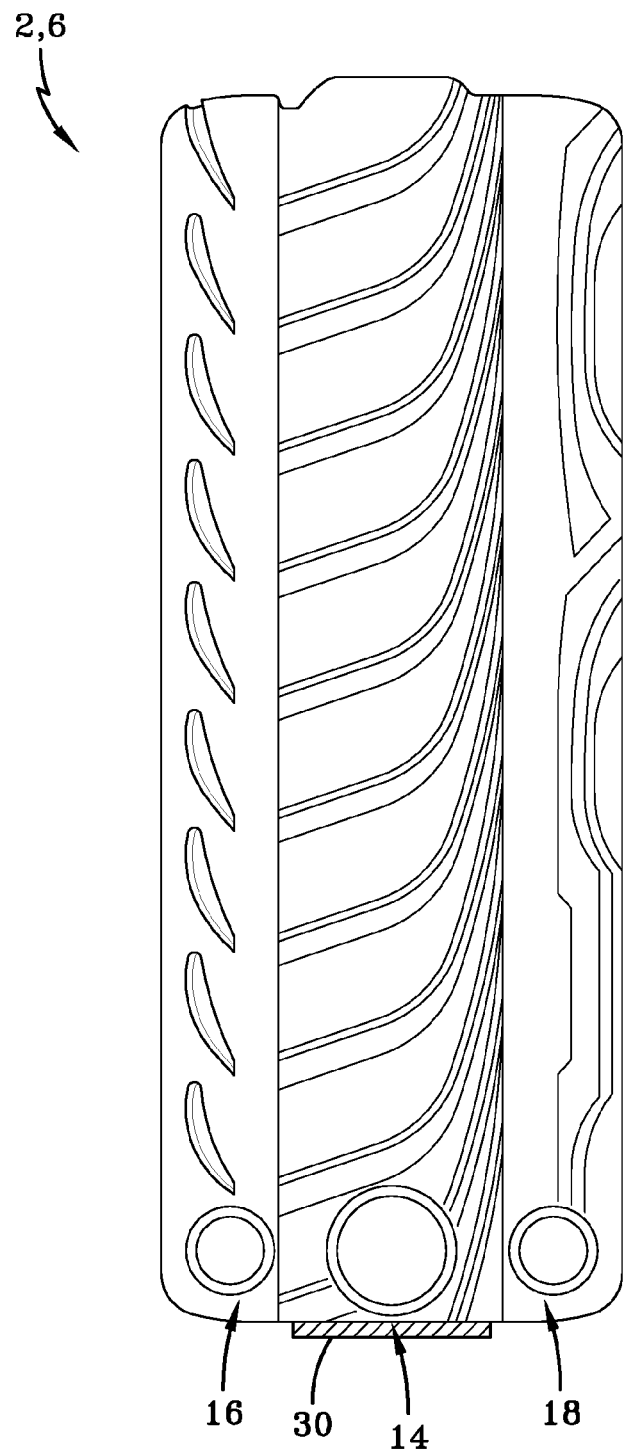
FIG. 3 is a representation of the tire of FIG. 1 in a second mode, namely where the pressure in the central auxiliary chamber is higher than in the side chambers.
Figure 4:
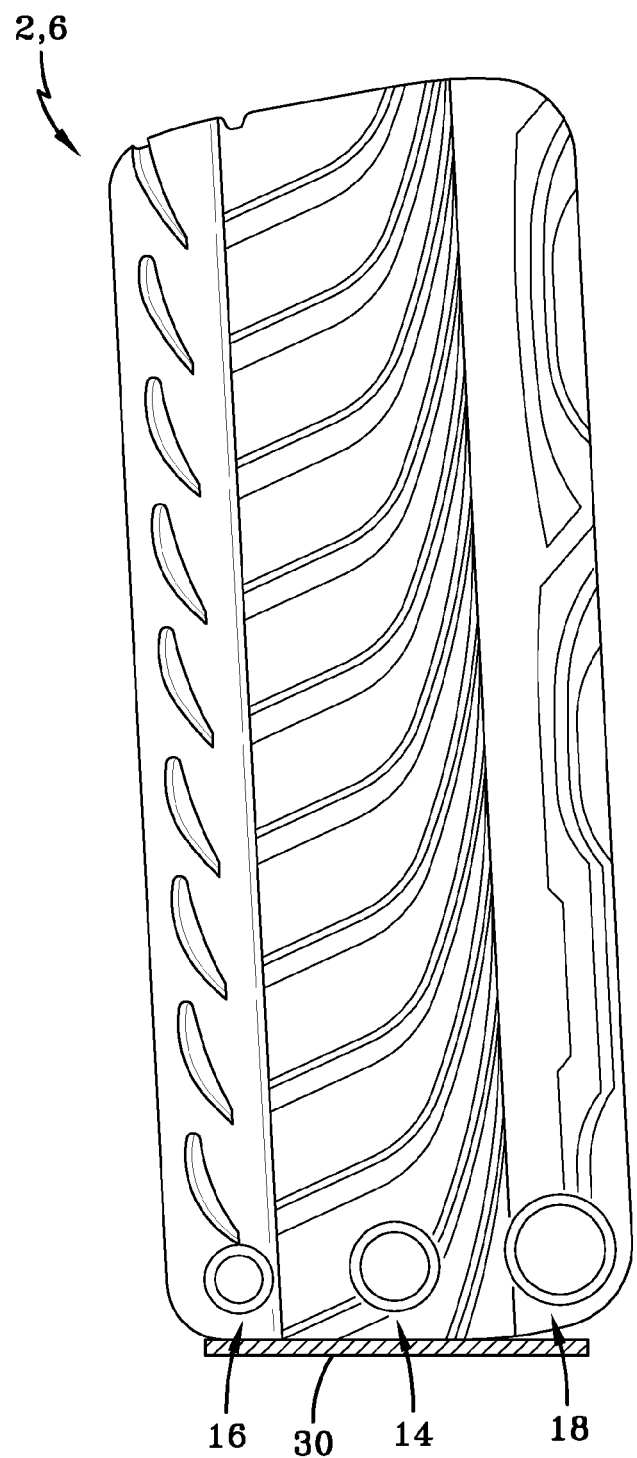
FIG. 4 is a representation of the tire of FIG. 1 in a third mode, namely where the pressure in the central auxiliary chamber is higher than in one of the side chambers and lower than in the other side chamber.

The air transferring device 28 is configured to operate the configurations that are illustrated in FIGS. 2, 3 and 4.

FIG. 2 illustrates a first mode where the three chambers 14, 16 and 18 have at least approximately the same pressure so that the contact surface 30 with the road corresponds to the width of the tire (less the shoulder portions). This mode corresponds to a normal position where the rolling resistance is the lowest one and the dry braking performance is good due to a maximum contact surface with the road.

FIG. 3 illustrates a second mode where the pressure in the central chamber 14 is higher than in the side chambers 16 and 18. This results in a narrower contact surface 30 with the road. This is due to the deformation of the outer surface of the tread portion of the tire, exhibiting a central raised area. This mode is for extreme conditions like rain or mud.

FIG. 4 illustrates a third mode where the pressure in the chambers increases progressively from one side of the tire to the other side. In other words, the pressure in the central chamber 14 is higher than in the left (when looking at the drawing) side chamber 16, this pressure being however lower than in the right (still when looking at the drawing) chamber 18. The contact surface 30 is similar to the contact surface of the first mode (FIG. 2). However the pressure distribution is different since, for instance, the right portion of the contact surface 30 is subject to higher contact pressures than the left portion. This mode corresponds to a sporty one with greater handling on dry road through an optimized contact surface using an active cambered shape. More specifically, the auxiliary chambers on the sides of the tires that correspond to an external side of a curve can be pressurized with a higher pressure than the inner side, so as to compensate the load transfer due to the centrifugal forces.

It shall be mentioned that the number of auxiliary chambers can depart from three as in the above embodiment.

The system of the present application provides significant advantages, including: the possibility of setting or configuring in a reduced lap of time the tire to the shape required for particular driving conditions, and an extended mobility through multiple independent air chambers.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A tire comprising:
a tread portion and side walls, said tread portion and side walls defining a main air chamber;
a first, central auxiliary air chamber and two second auxiliary air chambers, the auxiliary air chambers being formed in the tread portion; and
a device for controlling the pressure in the auxiliary air chambers, the device being configured for operating in
a first mode where the pressure in each of the first and second auxiliary air chambers is substantially the same,
a second mode where the pressure in the first auxiliary air chamber is lower than in the second auxiliary air chambers, and
a third mode where the pressure in the central auxiliary air chamber is higher than in one of the second auxiliary air chambers and is lower than in the other of the second auxiliary air chambers, the pressures in the first and second chambers being greater than atmospheric pressure continuously in each of the first, second and third modes, the main air chamber of the tire having a pressure continuously greater than the first and second pressures in each of the first, second, and third modes.

2. The tire according to claim 1, wherein the tread portion comprises an outer surface, said surface being substantially flat in the first mode, said surface comprising a central annular raised area in the second mode and said surface being substantially flat and inclined in the third mode.

3. The tire according to claim 1, wherein the tread portion comprises an outer surface with a central strip corresponding to the first auxiliary air chamber and two side strips corresponding to the second auxiliary air chambers, respectively; the outer surface comprising an annular recess between the central strip and at least one of the side strips.

4. The tire according to claim 1, wherein the device for controlling the pressure is an air transfer device for transferring air between the main air chamber and each of the auxiliary air chambers.

5. The tire according to claim 1, wherein the device for controlling the pressure comprises a transceiver for wirelessly communicating with an external device.

6. The tire according to claim 1, wherein air pressures in each of the auxiliary chambers remain in the range of 1.6 bar to 2.6 bar throughout the first, second, and third modes.

\* \* \* \* \*